United States Patent [19]

Ueda

[11] Patent Number: 5,029,225

[45] Date of Patent: Jul. 2, 1991

[54] TEXTURE MAPPING APPARATUS

[75] Inventor: Tomoaki Ueda, Kyoto, Japan

[73] Assignee: Daikin Industries, Ltd., Japan

[21] Appl. No.: 410,017

[22] Filed: Sep. 20, 1989

Related U.S. Application Data

[63] Continuation of Ser. No. 100,677, Sep. 24, 1987, abandoned.

[30] Foreign Application Priority Data

Sep. 24, 1986 [JP] Japan ................. 61-225140

[51] Int. Cl.$^5$ ............................................ G06K 9/00
[52] U.S. Cl. ...................... 382/28; 382/42; 382/45; 340/728; 364/474.31; 364/474.36
[58] Field of Search ............ 382/42, 44, 45, 49, 382/28; 358/428, 22, 160, 180; 340/728, 729, 286.14; 364/474.31, 474.36

[56] References Cited

U.S. PATENT DOCUMENTS

| | | | |
|---|---|---|---|
| 3,805,035 | 4/1974 | Serra | 382/28 |
| 4,334,245 | 6/1982 | Michael | 358/183 |
| 4,578,812 | 3/1986 | Yui | 358/180 |
| 4,611,348 | 9/1986 | Williams et al. | 382/44 |
| 4,751,660 | 6/1988 | Hedley | 382/44 |
| 4,791,582 | 12/1988 | Ueda et al. | 340/729 |
| 4,805,116 | 2/1989 | Liang et al. | 340/728 |

FOREIGN PATENT DOCUMENTS 0165086 11/1985 European Pat. Off. ............. 382/28

OTHER PUBLICATIONS

Shibamoto et al., "What is the Texture Mapping", Association of Data Processing, Sep. 9, 1985.

W. K. Taylor, "Optical Texture Recognition" Conference, Teddington, England (12-14 Apr. 1972).

Primary Examiner—David K. Moore
Assistant Examiner—Yon Jung
Attorney, Agent, or Firm—Beveridge, DeGrandi & Weilacher

[57] ABSTRACT

Texture mapping apparatus in which two sides of a polygon on a display plane and two sides of a polygon on a texture plane are linearly interpolated synchronously, line segments obtained are linearly interpolated synchronously, linear interpolation data of the line segments on the texture plane are loaded in a mapping memory, and data read out from the mapping memory are projected on the display plane, whereby a texture original figure is mapped.

7 Claims, 5 Drawing Sheets

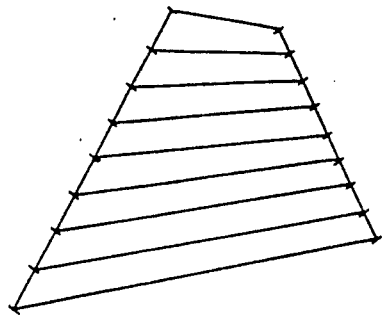
Fig. 4
(A)
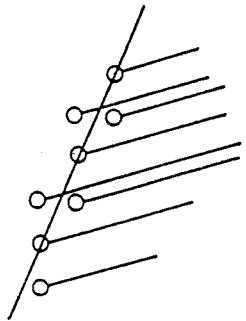
Fig. 4
(B)
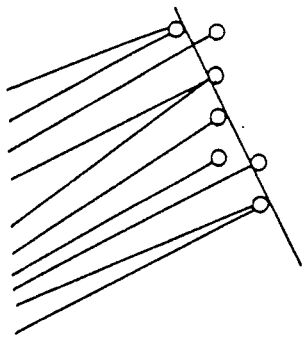
Fig. 4
(C)
Fig. 5
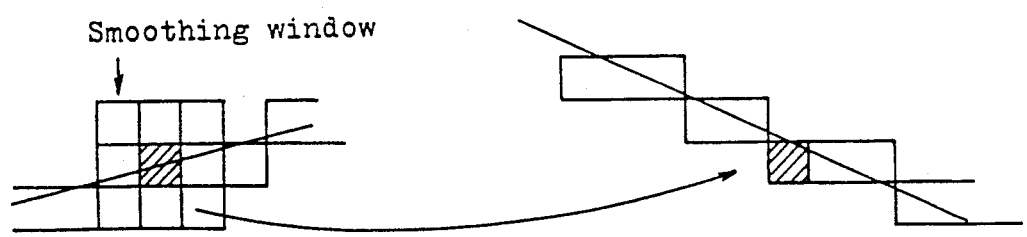
Smoothing window

TEXTURE ORIGINAL FIGURE

TARGET FIGURE

TARGET FIGURE

U-V PLANE

X-Y PLANE

TEXTURE MAPPING APPARATUS

This application is a continuation of application Ser. No. 07/100,677 filed Sept. 24, 1987 and now abandoned.

BACKGROUND OF THE INVENTION

The present invention relates to a texture mapping appartus for projecting picture element information in a desired area on a texture plane, on figure data in a desired area on a display plane.

There has been increased the demand for ensuring designing or image effects by projecting a desired area of figure data previously supplied from an image input device, or figure data drawn by a figure drawing device, on a surface of a desired solid figure. To satisfy such demand, there have been provided texture mapping apparatus for projecting and displaying a desired two-dimensional figure on a desired three-dimensional figure.

There is known a texture mapping apparatus in which a two-dimensional texture original figure is divided in line segments in the scan line direction, and the line segments thus obtained are subjected to an inverse perspective transformation for each picture element while the line segments are being scanned on the display plane in the scan line direction, see ("What is the Texture Mapping (1)", in the Collection of Lectures and Theses [III] by Takeshi SHIBAMOTO and Makoto KOBAYASHI, Association of Data Processing, Published in Sep. 9, 1985).

In the texture mapping apparatus arranged as above-mentioned, it is required to carry out a matrix operation for each picture element, creating a problem of slow processing speed. Further, accurate mapping cannot be always achieved dependent on the combination of unit polygons constituting a texture original figure with unit polygons constituting a figure on the display plane. This disadvantageously presents deterioration in quality of figure data displayed on the display plane.

Further, there are instances where polygons constituting a figure on the display plane present a butterfly plane. It is therefore required to previously judge whether or not three apexes of a polygon exist on the same plane on which another apex exists, thereby to identify whether or not the polygon presents a butterfly plane. This not only results in time-consuming further processing, but also presents the problem that accurate texture mapping cannot be achieved.

More specifically, when the apexes of opposite sides of a polygon exist on a spline curved line, a butterfly plane is inevitably generated by dividing the polygon in unit polygons in the form of a quadrilateral. When this butterfly plane is divided into two triangles and these triangles are filled to achieve texture mapping, portions of the polygon which should not be filled, are consequently filled in view of the nature of the butterfly plane.

SUMMARY OF THE INVENTION

It is an object of the present invention to provide a texture mapping apparatus capable of accurately mapping a texture original figure at a high speed.

It is another object of the invention to provide a texture mapping apparatus capable of accurately mapping a texture original figure at a high speed even though a polygon presents a butterfly plane.

It is a further object of the invention to provide a texture mapping apparatus capable of mapping a texture original figure without the use of an additional memory.

In order to achieve the objects above-mentioned, the texture mapping apparatus in accordance with the present invention comprises first and second side detector means, first and second side interpolation means, first and second line segment interpolation means and a mapping memory.

The first side detector means is adapted to detect two opposite sides of a Polygon having a unit area at a display side which constitutes a desired area on a display plane. The second side detector means is adpated to detect two sides of a polygon having a unit area at a texture side which constitutes a desired area on a texture plane, the two sides corresponding to the first-mentioned two opposite sides at the display side.

The first side interpolation means is adapted to linearly interpolate the opposite sides of a unit area polygon at the display side, while the second side interpolation means is adapted to linearly interpolate two sides of a unit area polygon at the texture side.

Interpolation data supplied from the first side interpolation means are entered into the first line segment interpolation means, while interpolation data supplied from the second side interpolation means are entered into the second line segment interpolation means. The second line segment interpolation means is adapted to carry out an interpolation operation in synchronism with the first line segment interpolation means.

Address data supplied from the second line segment interpolation means are entered into the mapping memory, from which address data corresponding to the address data thus entered are read out.

In accordance with the texture mapping apparatus having the arrangement above-mentioned, the first side detector means detects two opposite sides of a unit area polygon area at the display side which constitutes a desired area on the display plane, and the second side detector means detects two sides of a unit area polygon at the texture side which constitutes a desired texture plane, these two sides corresponding to the first-mentioned two opposite sides at the display side.

These pairs of sides are linearly interpolated by the first and second side interpolation means, respectively.

Interpolation data supplied from the first side interpolation means are entered into the first line segment interpolation means, which then generates picture element data. Interpolation data supplied from the second side interpolation means are entered into the second line segment interpolation means, which then generates address data.

Address data supplied from the second line segment interpolation means are entered into the mapping memory, from which address data such as color code data are read out from the mapping memory.

That is, texture mapping can be carried out by displaying data read out from the mapping memory, as picture element data to be displayed.

The following description will discuss the present invention in more detail.

With reference to FIGS. 7 through 9, according to the present invention, it is premised that a figure to be texture-mapped is limited to a triangle, a convex quadrilateral and a non-plane surrounded by four line segments only. The reason of why such restrictions can be imposed is because all figures used for computer graphics can be expressed in terms of an assembly of polygons and an assembly of non-planes each surrounded by four line segments, and each of the polygons can be divided into triangles and/or convex quadrilaterals.

With reference to FIGS. 10 and 11, it is now supposed that a texture plane is expressed in terms of a u-v plane and a display plane is expressed in terms of an x-y plane. The coordinates of the end points of two sides a and b defining a mapping area on the display plane are expressed as (xas, yas), (xae, yae), (xbs, ybs) and (xbe, ybe), while the coordinates of the end points of two sides a' and b' on the texture plane which correspond to the two sides a and b on the display plane, are expressed as (uas, vas), (uae, vae), (ubs, vbs) and (ube, vbe).

To divide the area surrounded by the sides a and b into (L+1) line segments, the sides a and b, and the sides a' and b' are respectively divided into (L+1) portions, for which linear interpolation is carried out. Linear interpolation is also carried out for z and I values as necessary.

Accordingly, the coordinates values of the end points of a line segment j obtained by carrying out the linear interpolation operation above-mentioned, are expressed as;

$$xaj = xas + j(xae - xas)/(L+1),$$

$$yaj = yas + j(yae - yas)/(L+1),$$

$$uaj = uas + j(uae - uas)/(L+1),$$

$$vaj = vas + j(vae - vas)/(L+1),$$

$$xbj = xbs + j(xbe - xbs)/(L+1),$$

$$ybj = ybs + j(ybe - ybs)/(L+1),$$

$$ubj = ubs + j(ube - ubs)/(L+1), \text{ and}$$

$$vbj = vbs + j(vbe - vbs)/(L+1).$$

[provided that j is equal to or greater than 0 and equal to or smaller than (L+1), and preferably, L is equal to $(\Delta x + \Delta y)$ (where $\Delta x$ is a length of a line segment in the direction of the x-coordinate axis on the display plane, whereas $\Delta y$ is a length of a line segment in the direction of the y-coordinate axis on the display plane.)]

Then, the line segments on the texture plane and on the display plane thus obtained are divided into M portions and linearly interpolated.

The coordinates values of the respective points obtained by such linear interpolation are expressed as;

$$xjk = xaj + k(xbj - xaj)/M$$

$$yjk = yaj + k(ybj - yaj)/M$$

$$ujk = uaj + k(ubj - uaj)/M$$

$$vjk = vaj + k(vbj - vaj)/M$$

[provided that k is equal to or greater than 0 and equal to or smaller than M, and preferably M represents the number of picture elements of a line segment to be drawn on the display plane]

By displaying the data in the mapping memory corresponding to (ujk, vjk), on the address (xjk, yjk), a texture-mapped figure can be displayed on the display plane.

Thus, according to the present invention, a texture original figure can be mapped accurately at a high speed regardless of the types of polygons on the display plane. Such mapping can be achieved without the use of an additional memory, thus simplifying the arrangement.

BRIEF DESCRIPTION OF THE DRAWINGS

FIG. 2 to FIG. 5 are views illustrating portions of the texture mapping operation, wherein, in particular,:

FIG. 2 illustrates a polygon having four apexes on the display plane;

FIG. 3A illustrates an equilateral triangle having a data structure corresponding to the polygon of FIG. 2;

FIG. 3B illustrates division of the triangle of FIG. 3A into line segments having lengths in a range from L to 2L dotts whereby the total of dotts required for the figure is given by $3L^2$;

FIG. 3C illustrates division of the triangle of FIG. 3A into line segments in accordance with the present invention so that each segment has a length of L dotts and the total number of dotts required for the figure is given by $2L^2$;

FIG. 4A illustrates the selection of two sides prior to determination of a division number for linear interpolation; FIG. 4B illustrates that, for the longer side, all end points through which the longer side passes are end points of line segments to be divided;

FIG. 4C illustrates that all picture elements through which the shorter side passes are end points of one or more line segments to be divided; and FIG. 5 is a diagram useful in understanding a smoothing operation.

DETAILED DESCRIPTION OF THE PREFERRED EMBODIMENTS

Figure 1:
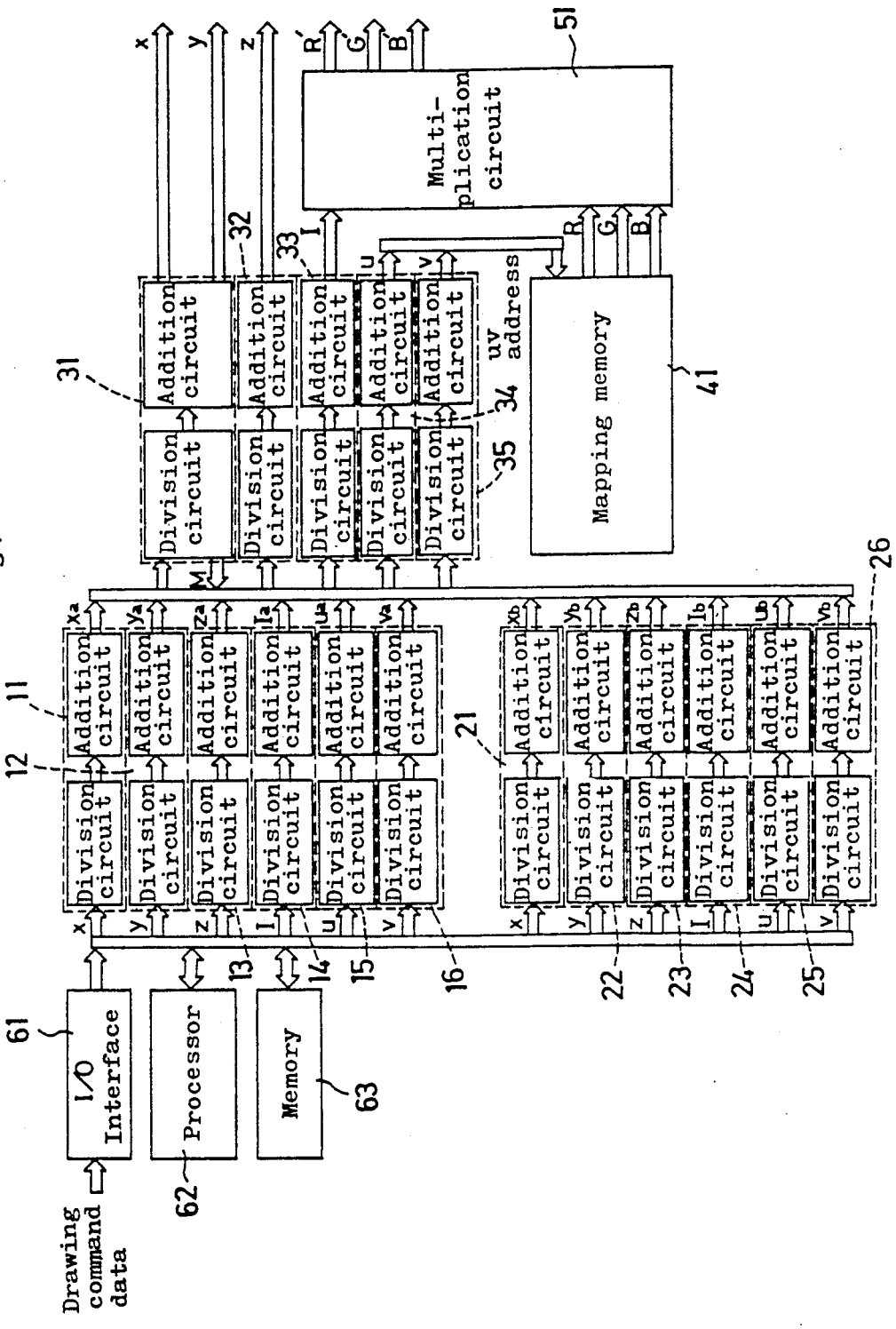
FIG. 1 is a block diagram of a texture mapping apparatus in accordance with a first embodiment of the present invention.

FIG. 1 is a block diagram illustrating a texture mapping apparatus in accordance with a first embodiment of the present invention, which comprises:

side interpolation circuits 11 to 16 and 21 to 26 for x-, y-, and z-values (three dimensional coordinates data of two sides on the display plane) and an I-value (brightness data of the two sides), and u- and v-values (two dimensional coordinates data of two sides on the texture plane);

a line segment interpolation circuit 31 to which entered are data supplied from the side interpolation circuits 11, 12, 21 and 22;

line segment interpolation circuits 32, 33, 34 and 35 to which entered are z-, I-, u- and v-values supplied from the side interpolation circuits;

a mapping memory 41 for memorizing u- and v-values supplied from the line segment interpolation circuits 34 and 35;

a multiplication circuit 51 to which R-, G- and B-data (color code data) read from the mapping memory 41, and I-data supplied from the line segment interpolation circuit 33 are entered for achieving shading correction, etc.;

an I/O interface 61 for fetching drawing command data;

a processor 62 for executing, for example, a side selection processing; and a memory 63.

Each of the side interpolation circuits includes a division circuit and an addition circuit for cumulatively adding a division result. This is the same in each of the line segment interpolation circuits. Accordingly, the respective interpolation processings can be concurrently executed.

The processor 62 is adapted to select, based on apex data sent from a host processor (not shown), two sides for which side interpolation is to be carried out. This processor 62 is also adapted to supply x-, y- and z- data supplied from the line segment interpolation circuits 31 and 32 and color code data (R, G and B data) read from the mapping memory 41, to a frame memory (not shown).

The following description will discuss the operation of the texture mapping apparatus having the arrangement above-mentioned.

The processor 62 selects, out of a plurality of apex data transmitted thereto, apex data which correspond to the starting and terminal points of two sides for which side-interpolation is to be carried out. A pair of apex data for each side are supplied to the side interpolation circuits 11 to 14 and the side interpolation circuits 21 to 24. Those apex data of a figure on a texture plane which correspond to said pair of apex data, are also selected. A pair of apex data for each side are supplied to the side interpolation circuits 15 and 16 and the side interpolation circuits 25 and 26. Based on the length of a side determined by a pair of apex data, there are calculated division number data with which side interpolation is to be carried out (for example, such division number data are calculated as a numeral in which 1 is added to the sum of the number of pixels in the x direction between two apexes and the number of pixels in the y direction between the same two apexes). The division number data thus calculated are supplied to the side interpolation circuits 11 to 16 and the side interpolation circuits 21 to 26.

In each of the side interpolation circuits into which both data above-mentioned have been entered, the side length (difference between the two values corresponding to both apexes) is divided by the division number data. Each quotient is successively accumulated to the data of one apex to obtain side interpolation data, which are then supplied to the line segment circuit concerned.

In the line segment interpolation circuit 31, based on a pair of side interpolation data, there is calculated the length of a line segment, based on which there are calculated division number data with which line segment interpolation is to be carried out (for example, the number of pixels in the x direction and the number of pixels in the y direction between two points are compared with each other in size, and the greater one is selected). The difference between the starting and terminal points in the direction of each coordinate axis is divided by the division number data. By cumulatively adding each quotient successively to data of one end point, line segment interpolation data are obtained. The data thus obtained are supplied to the frame memory (not shown).

In the remaining line segment interpolation circuit, a difference between the values corresponding to the end points is divided by the division number data calculated in the line segment interpolation circuit 31. By cumulatively adding each quotient successively to the data of one end point, line segment interpolation data are obtained. Line segment interpolation data from the line segment interpolation circuit 32 are supplied, as z-values, to the frame memory. Line segment interpolation data from the line segment interpolation circuits 34 and 35 are supplied to the mapping memory 41. Color code data (R, G and B data) read from the mapping memory 41, and line segment interpolation data (I values) from the line segment interpolation circuit 33 are supplied to the multiplication circuit 51. Thus, a shading processing is executed. The multiplication circuit 51 supplies data, as color code data in which shading processing has been carried out (R', G' and B' data), to the frame memory.

That is, by projecting figure data in the mapping memory 41, on picture element coordinates on the display plane obtained by the line segment interpolation circuits 31 and 32, data corresponding to a texture-mapped figure can be stored in the frame memory. By displaying the contents of the frame memory on a display, the texture-mapped figure can be visually displayed.

More specifically, two sides are linearly interpolated and line segments obtained are linearly interpolated so that a texture original figure is accomodated to a figure on the display plane. Accordingly, even though the mapping area on the display plane presents a butterfly plane, the texture original figure can be properly projected.

As apparent from the foregoing, it is relatively likely that many portions of a figure are to be drawn as overlapped on the texture plane. In the linear interpolation operation, however, simple cumulative additions only are required after one division has been carried out. Therefore, by providing the interpolation circuits in hardware, the entire processing time can be shortened, as compared with a conventional method in which matrix conversion is carried out for each picture element.

Figure 2:
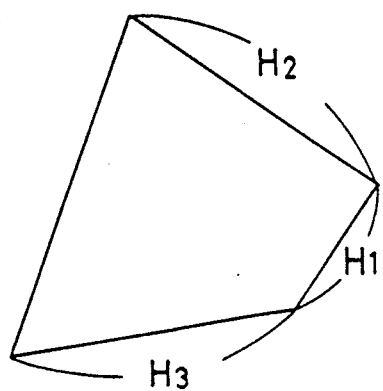

FIG. 2 is useful in illustrating the operation of the present invention to be carried out in a more preferred manner.

When x- and y-coordinates of four apexes on the display plane are given (for three apexes, the same operation can be also applied, but the detailed description is here omitted), the shortest side H1 is determined. For example, the lengths of the sides can be compared based on values obtained by adding the difference between the x-coordinate values of two apexes of each side, to the difference between the y-coordinate values of these two apexes. The side having such value which is the smallest, is defined as the shortest side. Then, the sides H2 and H3 adjacent this shortest side are selected as two sides. Also, two sides on the texture plane corresponding to the first-mentioned two sides on the display plane, are selected.

Figure 3:
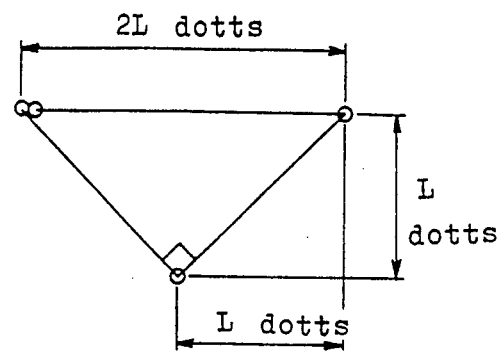
Figure 3:
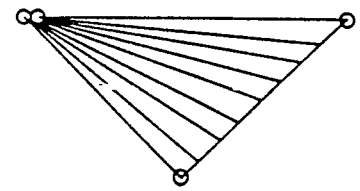
Figure 3:
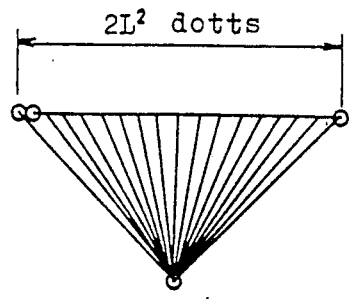

Such selection of two sides enables reduction of the number of picture elements to be drawn. More specifically, there is now given an example in which a figure has a data structure corresponding to a quadrilateral, but has a shape which can be approximated to a right-angled equilateral triangle, in which the longest side has 2L Pixels or "dotts" and the distance between the longest side and the remotest apex therefrom is L dotts as shown in FIG. 3A. When the shortest side and the side opposite thereto are selected, the figure is divided into 2L line segments, as shown in FIG. 3B. When the other two sides are selected, the figure is also divided into 2L line segments as shown in FIG. 3C. However, in the case of FIG. 3B, each of the 2L line segments has a length in a range from L to 2L dotts and the number of dotts to be drawn is $3L^2$, whereas in the case of FIG. 3C, each of the line segments has a length of L dotts and the number of dotts to be drawn is $2L^2$. Accordingly, the number of dotts to be drawn is reduced by $L^2$ in the case of FIG. 3C.

The following description will discuss the operation, to be carried out in a more preferred manner, of determining a division number to be used for achieving linear interpolation of two sides selected as mentioned above.

When two sides are selected as shown in FIG. 4A, there are calculated the number of dotts in the x direction $\Delta x1.\Delta x2$ and the number of dotts in the y direction $\Delta y1.\Delta y2$ which exist between the end points of each side. Then, there are compared the numbers of dotts of the sides ($|\Delta w1|+|\Delta y1|+1$, and $|\Delta x2|+|\Delta y2|+1$) with each other. The greater one is selected as a division number for linear interpolation.

When the division number is thus selected, all picture elements through which the longer side passes, are end points of line segments to be divided, as shown in FIG. 4B, while all picture elements through which the shorter side passes, are end points of one or more line segments to be divided, as shown in FIG. 4C. Accordingly, all line segments produced by the division operation are not separated from one another by one picture element or more. This securely prevents the presence of picture elements which have not been mapped.

The division number obtained in the manner above-mentioned is also used, as it is, for a division number with which two sides on the texture plane is linearly interpolated. Therefore, there is a likelihood that at least portions of all line segments produced by dividing a figure are separated from one another by 2 or more picture elements, dependent on the size of a texture original figure. However, this does not particularly cause any inconvenience since it is a figure on the display plane that is finally displayed in a visual manner.

After two opposite sides have been linearly interpolated in the manner above-mentioned, line segments determined, based on the linear interpolation data are linearly interpolated.

In such case, a division number is calculated based on the length of a line segment on the display plane, and based on the division number thus calculated, the line segments on the display plane and on the texture plane are linearly interpolated.

Accordingly, picture element data on the display plane obtained by linear interpolation present no lack of dot. On the other hand, picture elements data on the texture plane obtained by linear interpolation might present lack dotts depending on the lengths of the line segments. However, this does not particularly cause any inconvenience since it is only picture elements on the display plane obtained by linear interpolation that are visually displayed.

However, a figure such as a straight line is disadvantageously displayed in a dotted line. In order to overcome such inconvenience, picture elements in a predetermined range around each picture element obtained by linear interpolation are subjected to a smoothing operation as illustrated in FIG. 5, before being on the display plane.

However, when a lack of dotts during the texture mapping operation can be allowed, a division number can be calculated based on the lengths of line segments on the texture plane, and based on the division number thus calculated, the line segments on the display plane and on the texture plane can be linarly interpolated.

Figure 6:
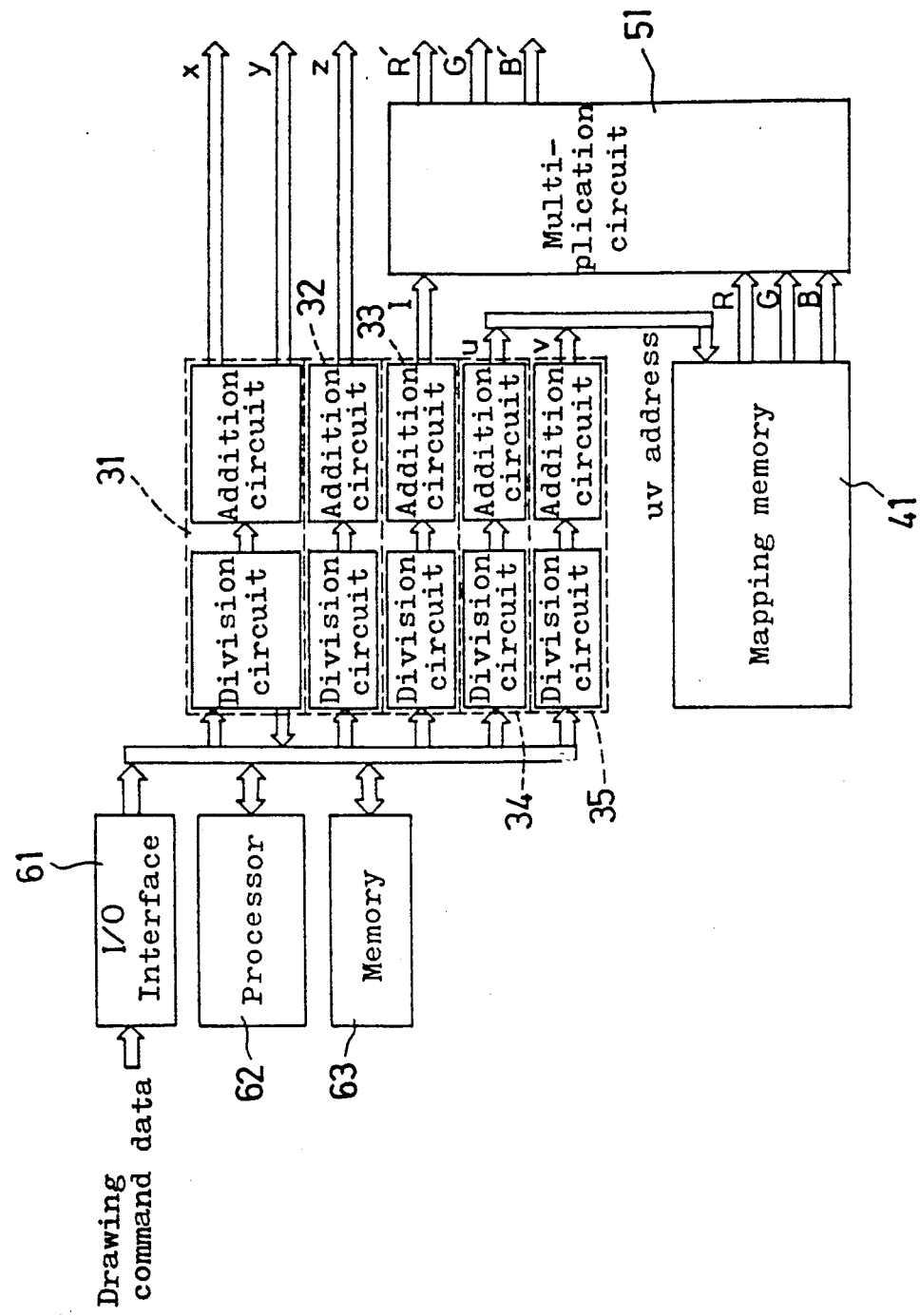
FIG. 6 is a block diagram of a texture apparatus in accordance with a second embodiment of the present invention.
Figure 7:
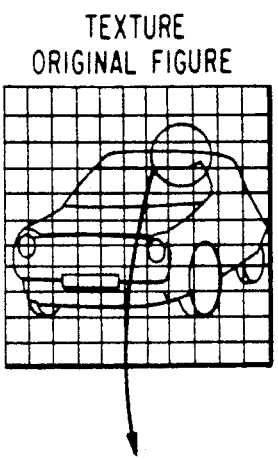
FIG. 7 is useful in understanding the present invention in depicting a texture original figure.
Figure 8:
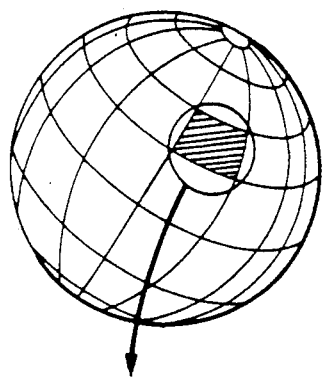
FIG. 8 is useful in understanding the present invention in depicting a target figure.
Figure 9:
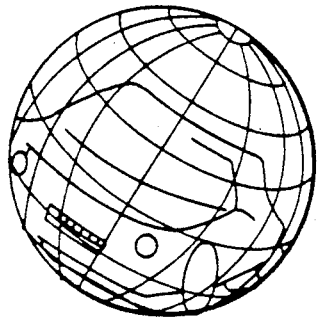
FIG. 9, is an illustration similar to FIG. 8 which shows an entire target figure.
Figure 10:
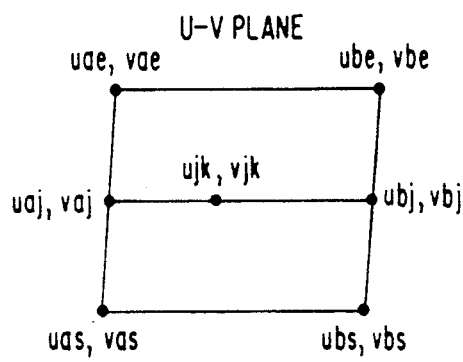
FIG. 10 is an illustration useful in understanding the present invention.
Figure 11:
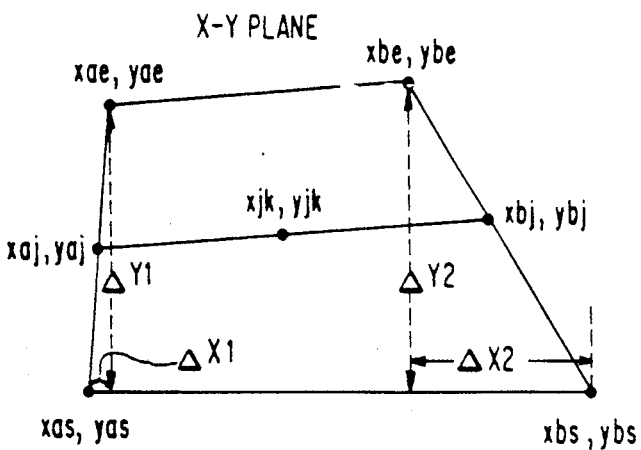
FIG. 11 is another illustration useful in understanding the present invention.

FIG. 6 is a block diagram illustrating a second embodiment of the present invention, which is the same as the first embodiment shown in FIG. 1 except for the following arrangement only. That is, in the second embodiment, the side interpolation circuits 11 to 16 and 21 to 26 in the first embodiment are omitted, and the linear interpolation operation on two sides are carried out by a processor 62.

Accordingly, in the second embodiment, the required processing time is lengthened as compared with that in the first embodiment in which linear interpolation of two sides is achieved by the side interpolation circuits.

In texture mapping, however, restrictions are imposed on the mapping processing speed by the time of reading data from the mapping memory or by the time of writing data to the frame memory. Accordingly, the entire processing time in the second embodiment is not lengthened so much. In other words, the second embodiment can achieve the entire texture mapping processing at a speed on the order of the speed in the first embodiment in FIG. 1.

More specifically, in an ordinary filling processing in the scan line direction, drawing can be made at a very high speed. In texture mapping, however, filling is carried out along line segments inclined with respect to the scan lines so that the drawing speed becomes slow (for example, about ⅓ of the drawing speed in the scan line direction). Therefore, linear interpolation of sides by the processor 62 can be achieved at a speed which does not exert a great influence on the drawing speed. As a result, even though the processing by the processor 62 takes a relatively longer time, the entire texture mapping processing can be executed at a speed on the order of the speed in the first embodiment.

It can be appreciated that the present disclosure is for the purpose of illustration only and various features of the invention may be modified as so desired. For example, operations for a brightness value I, a z-value and the like may be synchronized with the linear interpolation operation for the display plane and the operation results may be subjected to multiplication by the multiplier 51. Accordingly, shading processing, hidden surface removal, sectioning processing or the like also may be carried out. Further, the multiplication circuit 51 may be omitted so that texture mapping processing only may be carried out. Numerous other embodiments and modifications can be made by those skilled in the art without departing from the spirit and scope of the invention.

What is claimed is:

1. Texture mapping apparatus for mapping picture element information representative of a desired area on a texture plane to figure data representative of a desired area on a display plane, said apparatus comprising:

side detector means for detecting two opposite sides of a polygon having a first unit area on said display plane and two sides of a polygon having a second unit area on said texture plane corresponding to the two opposite sides of said first unit area polygon;

first side interpolation means for linearly interpolating said two detected opposite sides of said first unit area polygon and providing first side interpolation data;

second side interpolation means for linearly interpolating said two detected sides of said second unit area polygon and providing second side interpolation data;

first line segment interpolation means which receives said first side interpolation data supplied from said first side interpolation means and generates picture element data for display;

second line segment interpolation means which receives said second side interpolation data supplied from said second side interpolation means and generates address data therefrom, said first line segment interpolation means and said second line segment interpolation means performing their interpolation operations in synchronism; and a mapping memory which receives data from said second line segment interpolation means and provides color code data corresponding to said address data supplied.

2. Texture mapping apparatus as set forth in claim 1, wherein said side detector means detects two sides which are adjacent a shortest side of said first unit area polygon.

3. Texture mapping apparatus as set forth in claim 1, wherein said first side interpolation means linearly interpolates based on a division number determined by the sum of the lengths of the longer of the two sides, in both coordinate axis directions.

4. Texture mapping apparatus as set forth in claim 3, wherein said second side interpolation means linearly interpolates based on the division number used by said first side interpolation means.

5. Texture mapping apparatus as set forth in claim 1, wherein said second line segment interpolation means linearly interpolates based on a division number determined according to the number of said picture element data generated by said first line segment interpolation means.

6. Texture mapping apparatus as set forth in claim 5, wherein said second line segment interpolation means linearly interpolates based on figure data in which a predetermined number of picture elements have been smoothed, said predetermined number of picture elements being determined by said division number.

7. Texture mapping apparatus for mapping picture element information representative of a desired area on a texture plane to figure data representative of a desired area on a display plane, said apparatus comprising:

said detector means for detecting two opposite sides of a polygon having a first unit area on said display plane and two opposite sides of a polygon having a second unit area on said texture plane corresponding to the two opposite sides of said first unit area polygon;

first side interpolation means for linearly interpolating said two detected opposite sides of said first unit area polygon and providing first side interpolation data;

second side interpolation means for linearly interpolating said two detected opposite sides of said second unit area polygon and providing second side interpolation data;

first line segment interpolation means which receives said first side interpolation data supplied from said first side interpolation means, interpolates a first line segment represented by said first side interpolation data, and generates picture element data corresponding to said first line segment;

second line segment interpolation means which receives said second side interpolation data supplied from said second side interpolation means, interpolates a second line segment represented by said second side interpolation data, and generates address data corresponding to said second line segment, said first line segment interpolation means and said second line segment interpolation means performing their interpolation operations in synchronism; and a mapping memory which receives said address data from said second line segment interpolation means and provides color code data corresponding to said address data supplied, wherein figure data generated based on said picture element data and said color code data are visually displayed.

* * * * *